United States Patent Office 3,522,299
Patented July 28, 1970

3,522,299
PROCESS FOR THE OXIDATION OF OLEFINS TO ALDEHYDES AND ACIDS AND CATALYST THEREFOR
Shigeo Takenaka and Goichi Yamaguchi, Takasaki-shi, Japan, assignors to Nippon Kayaku Company, Ltd., Tokyo, Japan, a corporation of Japan
No Drawing. Filed Nov. 1, 1966, Ser. No. 591,085
Claims priority, application Japan, Nov. 17, 1965, 40/70,157; Dec. 3, 1965, 40/74,050
The portion of the term of the patent subsequent to July 8, 1986, has been disclaimed
Int. Cl. C07c $45/04$, $51/32$
U.S. Cl. 260—533       10 Claims

ABSTRACT OF THE DISCLOSURE

Olefins such as propylene and isobutylene are oxidized to the corresponding unsaturated aldehydes and unsaturated carboxylic acids at temperatures of from 250° to 500° C. with molecular oxygen or air in the presence of a catalyst such as $Ni_{4.5}Co_4FeBiAs_{0.5}P_{0.5}Mo_{12}O_{54}$.

This invention relates to the production of unsaturated aldehydes by the oxidation of olefins such as propylene and isobutylene with molecular oxygen or air in the presence of a novel catalyst corresponding to the empirical formula $Ni_aCo_bFe_cBi_dAs_eP_fMo_gO_h$ wherein $a$ is 0 to 20, $b$ is 0 to 20, the sum of $a$ plus $b$ equals 0.5 to 20, $c$ is 0.5 to 8, $d$ is 0.1 to 7, $e$ is 0 to 3, $f$ is 0 to 2, $g$ is about 12 and $h$ is 36 to 98. When $e$ in the foregoing formula is 0, $f$ is less than 0.1.

According to the present invention, the catalyst which is employed in a vapor phase catalytic oxidation reaction increases the total conversion to the desired useful products including unsaturated aldehydes without excessive oxidation of the olefins to undesired higher oxidation products of carbon such as carbon monoxide and carbon dioxide.

The process of this invention will now be considered in more detail in regard to the specific desired products, namely, unsaturated aldehydes.

In the present specification the following definitions are employed:

$$\text{Conversion (percent)} = \frac{\text{Mols of olefin converted}}{\text{Mols of olefin fed}} \times 100$$

$$\text{Selectivity (percent)} = \frac{\text{Mols of aldehyde obtained}}{\text{Mols of olefin converted}} \times 100$$

$$\text{Single pass yield (percent)} = \frac{\text{Mols of aldehyde obtained}}{\text{Mols of olefin fed}} \times 100$$

$$= \text{Conversion} \times \text{Selectivity}$$

UNSATURATED ALDEHYDES

The present invention is particularly effective in the conversion of propylene to acrolein and for this reason the preparation of acrolein from propylene is a preferred embodiment.

One of the main advantages of the process of this invention is the high yield of unsaturated aldehydes prepared from olefins over the catalyst embodied herein. In the case of the oxidation of propylene, for instance, in a representative example, under the proper operating conditions 78.2% by weight of the propylene fed to the reactor was converted to acrolein, 11.6% by weight of the propylene was converted to acrylic acid, which amounts to a yield of about 89.8% of useful products in a single pass of propylene over the catalyst.

The processes for the production of unsaturated aldehydes by the catalytic oxidation of olefins with air or molecular oxygen over the catalyst containing the oxides of bismuth, molybdenum and phosphorus has been previously described in U.S. Pat. No. 2,941,007. The same process carried out over a catalyst comprised of the oxides of iron, bismuth, phosphorus and molybdenum has been previously disclosed in German Pat. No. 1,125,901. Neither of these prior art catalysts contain nickel oxide, cobalt oxide and arsenic oxide; and in this respect the present catalyst compositions are clearly distinguished from those of the prior art.

The inclusion of nickel oxide, cobalt oxide or arsenic oxide or mixtures thereof in the catalysts embodied herein produces a very high yield of acrolein from propylene. It is apparent that this catalyst is of great commercial value as the following description will indicate.

According to the process of U.S. Pat. No. 2,941,007, 56.9% by weight of propylene fed to the reactor is consumed in a single pass over the catalyst and 71.8% of this propylene consumed is converted to acrolein and most of the remainder of the propylene consumed is converted to carbon monoxide and carbon dioxide. The highest single pass yield of acrolein based on the total propylene fed in U.S. Pat No. 2,941,007 is 41%.

In the process of Geran Pat. No. 1,125,901, 70% of the propylene fed in a single pass over the catalyst is consumed and of this 84% is converted to acrolein. Thus, an overall single pass conversion of propylene to acrolein in 59% is described in the German patent.

In vapor phase catalytic reactions it is generally found that as conversion of the reactants is increased there is a decrease in selectivity so that in the prior art vapor phase oxidation of propylene to acrolein, the single pass conversion to acrolein is usually not very high.

In marked contrast to the prior art processes, in a representative example in the present invention, 97.5% of the propylene fed in a single pass over the catalyst is consumed and 80.3% of the propylene consumed is converted to acrolein. Thus, an overall conversion of propylene to acrolein of 78.2% is obtained in a single pass in the process of this invention. This is indeed unobvious and unexpected in view of the prior art.

When vapor phase catalytic oxidation reactions of the type embodied herein are carried out beyond the point where the total conversion is specific to the catalyst, the production of undesired carbon monoxide and carbon dioxide usually increases and the overall yield of the desired product, such as acrolein, decreases correspondingly.

In the prior art processes it is necessary to recycle unreacted propylene in order to achieve a high yields of acrolein as those obtained in a single pass in the present invention.

In the prior art processes when the unreacted propylene is separated from the reactor effluent which has been passed over the catalyst once and is fed back to the raw propylene feed, the ultimate conversion increases and therefore the yield of acrolein based on the propylene fed increases. When carried out on a commercial scale, it is clear that the process of the present invention, which produces a very high single pass conversion of the propylene and a high yield of acrolein, does not require the recovery and recycle of propylene. Thus, the present process has a decided advantage over the prior art processes in plant construction and operation costs.

CATALYST

The catalyst useful in the process of the present invention is the homogeneous mixture, compound or possibly a complex of some unknown physical or chemical nature. The composition is conveniently expressed in the following empirical formula:

$$Ni_aCo_bFe_cBi_dAs_eP_fMo_gO_h$$

wherein $a$ is 0 to 20, $b$ is 0 to 20, the sum of $a$ plus $b$ equals 0.5 to 20, $c$ is 0.5 to 8, $d$ is 0.1 to 7, $e$ is 0 to 3, $f$ is 0 to 2, $g$ is about 12 and $h$ is 36 to 98. When $e$ in the foregoing formula is 0, $f$ is less than 0.1.

It is believed that the nickel, cobalt, iron, bismuth, arsenic, phosphorous and molybdenum components in this catalyst exist in the form of their oxides. The particularly preferred catalysts are those having the above formula in which:

(1) $a$ is 3 to 14, $b$ is 0, $c$ is 1 to 3, $d$ is 1 to 3, the sum of $e$ plus $f$ is about 1, $g$ is 12 and $h$ is 45 to 68.5,
(2) $a$ is 0, $b$ is 2 to 7, $c$ is 1 to 3, $d$ is 1 to 3, the sum of $e$ plus $f$ is about 1, $g$ is 12 and $h$ is 43 to 58, and
(3) $a$ is less than 14, $b$ is less than 7, the sum of $a$ plus $b$ is 2 to 14 and $a$ and $b$ are both greater than 0, $c$ is 1 to 3, $d$ is 1 to 3, the sum of $e$ plus $f$ is about 1, $g$ is 12 and $h$ is 43 to 68.5.

The catalyst of this invention is usually prepared by adding aqueous solution of the suitable water-soluble salt of nickel, cobalt, iron and bismuth, arsenic compound and phosphorous compound to aqueous solution of suitable molybdate such as ammonium molybdate. The resulting slurry is then heated with a carrier, if desired, to remove water and dry the solid cake which forms. The solid cake is then calcined at an elevated temperature in the air. This calcination is useful for making the specific surface area of the catalyst proper and increasing the selectivity.

Suitable water-soluble salts for the prepartion of the catalyists of this invention are nickel nitrate, cobalt nitrate, ferric nitrate and bismuth nitrate, for instance. Arsenic acid and arsenic oxide are used as the arsenic compound. In special cases, agents which form these water-soluble salts, such as the mixture of metal and acid or of metal oxide and acid may be used in place of water-soluble salts. Molybdenum oxide, molybdic acid or phosphomolybdic acid may suitably be used in place of ammonium molybdate.

The catalyst embodied herein is particularly effective when deposited upon a carrier. Suitable carriers include silica, silicon carbide and alumina. The carrier may be added as a sol or a gel to the slurry before the catalyst is dried and particularly silica gel and silica sol are effective. The catalyst is useful in many solid physical forms such as grains and pellets. The catalyst of this invention is suitable for use in a fixed bed reactor, in a fluidized bed reactor or in a moving bed reactor.

THE PROCESS CONDITIONS

The catalytic oxidation process of this invention is carried out at a temperature of from 250 to 500° C. and at a pressure of from 0.5 to 10 atmospheres absolute, and preferably at a temperature of from 300 to 450° C. at atmospheric pressure.

In the oxidation of propylene by the instant process, the contact time of the mixture of propylene and air with the catalyst is usually from 0.1 to 12 seconds and preferably from 0.5 to 8 seconds at one atmosphere pressure.

The feed for the process embodied herein usually requires the presence of from 0.5 to 4, and preferably 1.6 to 3, mols of oxygen per mol of propylene. Stated somewhat differently, the preferred mol ratios of ingredients in the gaseous feed mixture are from 2.5 to 20 moles of air per mol of propylene. It is preferred that water in the form of steam is fed to the reactor along with the gaseous mixture of propylene and air. A large volume of water in the feed effects a dilution and removal of reaction heat, but water need not be employed if the reaction heat can efficiently be removed. The mole ratio of water per mol of propylene may be in the range of 1 to 20, but a ratio of 2 to 6 is preferred. The feed gas in the instant process may contain saturated hydrocarbons such as ethane, propane, etc., because they are inert and do not effect the oxidation of the olefins.

In general, air is used as the source of molecular oxygen in the instant process; however, molecular oxygen, per se, or mixtures of oxygen and inert gases such as nitrogen, carbon dioxide, etc., may also be used.

Since the reaction is exothermic, the temperature within the reactor must be regulated in order to control the reaction. It is preferred that the reactor be placed in a fluidized solids bath, a salt bath such as a molten potassium nitrate bath, or a metal bath such as a tin bath.

As mentioned above, the yield of arcolein by the oxidation process of this invention is extremely high, but undesired oxidation products such as carbon monoxide and carbon dioxide are produced in minimal amounts.

The process of the present invention is further illustrated by the following examples.

EXAMPLE 1

105.0 grams of nickel nitrate, $Ni(NO_3)_2 \cdot 6H_2O$, 96.8 grams of cobalt nitrate, $Co(NO_3)_2 \cdot 6H_2O$, and 32.4 grams of ferric nitrate, $Fe(NO_3)_3 \cdot 9H_2O$, were dissolved in small quantity of water respectively. 37.6 grams of bismuth nitrate, $Bi(NO_3)_3 \cdot 5H_2O$, were dissolved in 28 ml. of distilled water containing 3.6 ml. of concentrated nitric acid. 10.6 grams of arsenic acid, $H_4As_2O_7$, were dissolved in distilled water. All of the foregoing solutions were added with stirring to the aqueous solution of 170.0 grams of ammonium molybdate, $(NH_4)_6Mo_7O_{24} \cdot 4H_2O$.

To the resulting slurry were added 60 grams of silica in the form of silica sol.

The resulting slurry was dried and heated to 300° C. After cooling, the resulting mass was pulverized, pelleted and calcined at 500° C. for 6 hours in the air.

The composition of the catalyst was represented by the following formula:

$$Ni_{4.5}Co_4Fe_1Bi_1As_1Mo_{12}O_{53}$$

EXAMPLES 2–19

Table I shows some variations of the manufacturing procedure and the compositions of catalyst prepared by the procedure of Example 1, and the procedure was as that of Example 1 except for the variation in condition shown in Table I.

TABLE I

| Example Number | Nickel nitrate | Cobalt nitrate | Ferric nitrate | Bismuth nitrate | Arsenic acid | Phosphoric acid (85%) | Ammonium molybdate | Composition of catalyst |
|---|---|---|---|---|---|---|---|---|
| 2 | 105.0 | 96.8 | 32.4 | 38.8 | 5.3 | 0 | 170.0 | $Ni_{4.5}Co_4Fe_1Bi_1As_{0.5}Mo_{12}O_{52.5}$ |
| 3 | 105.0 | 96.8 | 32.4 | 38.8 | 10.6 | 0 | 170.0 | $Ni_{4.5}Co_4Fe_1Bi_1As_1Mo_{12}O_{52.5}$ |
| 4 | 105.0 | 96.8 | 32.4 | 38.8 | 15.9 | 0 | 170.0 | $Ni_{4.5}Co_4Fe_1Bi_1As_{1.5}Mo_{12}O_{54}$ |
| 5 | 105.0 | 96.8 | 32.4 | 38.8 | 31.8 | 0 | 170.0 | $Ni_{4.5}Co_4Fe_1Bi_1As_3Mo_{12}O_{56}$ |
| 6 | 105.0 | 96.8 | 32.4 | 38.8 | 5.3 | 4.5 | 170.0 | $Ni_{4.5}Co_4Fe_1Bi_1As_{0.5}P_{0.5}Mo_{12}O_{54}$ |
| 7 | 105.0 | 96.8 | 32.4 | 38.8 | 10.6 | 9.0 | 170.0 | $Ni_{4.5}Co_4Fe_1Bi_1As_1P_1Mo_{12}O_{55.8}$ |
| 8 | 105.0 | 96.8 | 32.4 | 38.8 | 9.5 | 0.9 | 170.0 | $Ni_{4.5}Co_4Fe_1Bi_1As_{0.9}P_{0.1}Mo_{12}O_{52.4}$ |
| 9 | 105.0 | 96.8 | 32.4 | 38.8 | 1.1 | 8.1 | 170.0 | $Ni_{4.5}Co_4Fe_1Bi_1As_{0.1}P_{0.9}Mo_{12}O_{54.2}$ |
| 10 | 245.0 | 0 | 32.4 | 38.8 | 10.6 | 0 | 170.0 | $Ni_{10.5}Fe_1Bi_1As_1Mo_{12}O_{56}$ |
| 11 | 0 | 121.0 | 32.4 | 38.8 | 10.6 | 0 | 170.0 | $Co_5Fe_1Bi_1As_1Mo_{12}O_{48}$ |
| 12 | 70.0 | 48.4 | 64.8 | 75.2 | 10.6 | 0 | 170.0 | $Ni_3Co_2Fe_2Bi_2As_1Mo_{12}O_{51}$ |
| 13 | 35.0 | 24.2 | 97.2 | 112.8 | 10.6 | 0 | 170.0 | $Ni_2Co_1Fe_3Bi_3As_1Mo_{12}O_{51}$ |
| 14 | 105.0 | 96.8 | 32.4 | 38.8 | 0 | 0.75 | 170.0 | $Ni_{4.5}Co_4Fe_1Bi_1P_{0.08}Mo_{12}O_{51}$ |
| 15 | 105.0 | 96.8 | 32.4 | 38.8 | 0 | 0 | 170.0 | $Ni_{4.5}Co_4Fe_1Bi_1Mo_{12}O_{51}$ |
| 16 | 244.0 | 0 | 32.4 | 37.6 | 0 | 0 | 170.0 | $Ni_{10.5}Fe_1Bi_1Mo_{12}O_{54}$ |
| 17 | 0 | 145.5 | 32.4 | 37.6 | 0 | 0 | 170.0 | $Co_6Fe_1Bi_1Mo_{12}O_{48}$ |
| 18 | 70.2 | 48.4 | 64.8 | 75.2 | 0 | 0 | 170.0 | $Ni_3Co_2Fe_2Bi_2Mo_{12}O_{49}$ |
| 19 | 46.5 | 24.2 | 97.2 | 112.8 | 0 | 0 | 170.0 | $Ni_2Co_1Fe_3Bi_3Mo_{12}O_{49}$ |

EXAMPLE 20

140 ml. of the catalyst $Ni_{4.5}Co_4Fe_1Bi_1As_1Mo_{12}O_{53}$ obtained in Example 1 were placed in a reactor tube of 20 mm. in diameter dipped in a molten potassium nitrate bath maintained at 330° C.

A gaseous mixture of propylene, air and water in the form of steam in the molar ratio of 1:10:6 was passed over the catalyst at a contact time of 2.5 seconds.

The result of the reaction was as follows:

|  | Percent |
|---|---|
| Conversion of propylene | 94.3 |
| Selectivity of acrolein | 80.5 |
| Selectivity of acrylic acid | 7.6 |
| Single pass yield of acrolein | 75.8 |
| Single pass yield of acrylic acid | 7.2 |

EXAMPLES 21–37

Table II shows some variations of the oxdiation process of Example 20 except for the variation in conditions shown in Table II.

EXAMPLE 39

140 ml. of the catalyst used in Example 32 were placed in a reactor tube 20 mm. in diameter, dipped in molten potassium nitrate bath maintained at 270° C.

The gaseous mixture of isobutylene, air and steam in the molar ratio of 1:20:20 was passed over the catalyst at a contact time of 7 seconds. The result of the reaction was as follows:

|  | Percent |
|---|---|
| Conversion of isobutylene | 71.03 |
| Selectivity of methacrolein | 40.2 |
| Selectivity of methacrylic acid | 11.9 |
| Single pass yield of methacrolein | 28.3 |
| Single pass yield of methacrylic acid | 8.5 |

We claim:
1. The process for oxidizing olefins to unsaturated aldehydes and unsaturated acids comprising reacting in vapor phase at a temperature of from 250 to 500° C., at a pressure of from 0.5 to 10 atmospheres absolute, an

TABLE II

| Example Number | Catalyst composition | Reaction conditions | | Conversion, percent | Selectivity, percent | | Single Pass Yield, percent | |
|---|---|---|---|---|---|---|---|---|
| | | Contact time, sec. | Bath temp., °C. | | Acrolein | Acrylic acid | Acrolein | Acrylic acid |
| 21 | $Ni_{4.5}Co_4Fe_1Bi_1As_{0.5}Mo_{12}O_{52.5}$ | 2.5 | 320 | 92.2 | 78.2 | 6.3 | 72.0 | 5.8 |
| 22 | $Ni_{4.5}Co_4Fe_1Bi_1As_{1.5}Mo_{12}O_{54}$ | 2.5 | 340 | 97.9 | 72.1 | 11.0 | 70.2 | 10.7 |
| 23 | $Ni_{4.5}Co_4Fe_1Bi_1As_3Mo_{12}O_{56}$ | 2.5 | 380 | 66.5 | 75.9 | 2.0 | 50.4 | 1.3 |
| 24 | $Ni_{4.5}Co_4Fe_1Bi_1As_{0.5}P_{0.5}Mo_{12}O_{54}$ | 2.5 | 330 | 97.5 | 80.3 | 11.9 | 78.2 | 11.6 |
| 25 | $Ni_{4.5}Co_4Fe_1Bi_1As_1P_1Mo_{12}O_{55.8}$ | 2.5 | 360 | 86.4 | 76.1 | 3.8 | 65.7 | 3.3 |
| 26 | $Ni_{4.5}Co_4Fe_1Bi_1As_{0.9}P_{0.1}Mo_{12}O_{52.4}$ | 2.5 | 330 | 95.0 | 77.8 | 11.6 | 74.0 | 11.1 |
| 27 | $Ni_{4.5}Co_4Fe_1Bi_1As_{0.1}P_{0.9}Mo_{12}O_{54.2}$ | 2.5 | 330 | 94.8 | 77.9 | 10.4 | 73.8 | 9.8 |
| 28 | $Ni_{10.5}Fe_1Bi_1As_1Mo_{12}O_{56}$ | 2.5 | 300 | 95.0 | 79.5 | 7.7 | 77.5 | 7.3 |
| 29 | $Co_5Fe_1Bi_1As_1Mo_{12}O_{48}$ | 2.5 | 360 | 96.9 | 75.7 | 1.1 | 73.4 | 10.7 |
| 30 | $Ni_3Co_2Fe_2Bi_2As_1Mo_{12}O_{51}$ | 2.5 | 330 | 93.8 | 79.7 | 7.4 | 74.8 | 6.9 |
| 31 | $Ni_2Co_1Fe_3Bi_3As_1Mo_{12}O_{51}$ | 2.5 | 330 | 93.2 | 77.4 | 5.9 | 72.1 | 5.5 |
| 32 | $Ni_{4.5}Co_4Fe_1Bi_1P_{0.08}Mo_{12}O_{51}$ | 4 | 310 | 95.5 | 75.4 | 6.3 | 72.1 | 6.0 |
| 33 | $Ni_{4.5}Co_4Fe_1Bi_1Mo_{12}O_{51}$ | 4 | 310 | 96.5 | 74.5 | 5.7 | 71.8 | 5.5 |
| 34 | $Ni_{10.5}Fe_1Bi_1Mo_{12}O_{54}$ | 4 | 270 | 95.4 | 69.9 | 7.4 | 66.7 | 7.1 |
| 35 | $Co_6Fe_1Bi_1Mo_{12}O_{48}$ | 4 | 370 | 95.6 | 74.8 | 6.1 | 71.5 | 5.8 |
| 36 | $Ni_3Co_2Fe_2Bi_2Mo_{12}O_{49}$ | 4 | 310 | 94.2 | 74.7 | 4.3 | 70.4 | 4.0 |
| 37 | $Ni_2Co_1Fe_3Bi_3Mo_{12}O_{49}$ | 4 | 310 | 93.6 | 73.6 | 2.4 | 68.9 | 2.2 |

EXAMPLE 38

140 ml. of the catalyst obtained in Example 1 were placed in a reactor tube of 20 mm. in diameter, dipped in molten potassium nitrate bath maintained at 270° C.

The gaseous mixture of isobtuylene, air and steam in the molar ratio of 1:20:20 was passed over the catalyst at a contact time of 5 seconds.

The result of the reaction was as follows:

|  | Percent |
|---|---|
| Conversion of isobutylene | 64.3 |
| Single pass yield of methacrolein | 32.5 |
| Single pass yield of methacrylic acid produced as by-product | 10.4 | olefin selected from the group consisting of propylene and isobutylene with a gas selected from the group consisting of air, oxygen and mixtures thereof in the presence of an oxidation catalyst of the empirical formula

wherein $a$ is 0 to 20, $b$ is 0 to 20, the sum of $a$ plus $b$ equals 0.5 to 20, $c$ is 0.5 to 8, $d$ is 0.1 to 7, $e$ is from greater than 0 to 3, $f$ is 0 to 2, $g$ is about 12 and $h$ is 36 to 98.

2. The process of claim 1 wherein $a$ is 3 to 14, $b$ is 0, $c$ is 1 to 3, $d$ is 1 to 3, the sum of $e$ plus $f$ is 1, $g$ is about 12 and $h$ is 45 to 68.5.

3. The process of claim 1 wherein $a$ is 0, $b$ is 2 to 7, $c$ is from 1 to 3, $d$ is 1 to 3, the sum of $e$ plus $f$ is about 1, $g$ is 12 and $h$ is 43 to 58.

4. The process of claim 1 wherein $a$ is less than 14, $b$ is less than 7, the sum of $a$ plus $b$ equals 2 to 14, both $a$ and $b$ are greater than 0, $c$ is 1 to 3, $d$ is 1 to 3, the sum of $e$ plus $f$ is 1, $g$ equals 12, and $h$ is 43 to 68.5.

5. The process of claim 1 wherein the carrier is a silica carrier.

6. The process of claim 1 wherein the reaction is carried out in the presence of steam.

7. The process of claim 6 wherein the reaction is carried out at a temperature of from 300 to 450° C.

8. The process of claim 7 wherein the olefin is propylene.

9. The process of claim 7 wherein the olefin is isobutylene.

10. The process of claim 8 wherein the mol ratios of oxygen, steam and olefin are 0.5–4:1–20:1, respectively.

References Cited

UNITED STATES PATENTS

| | | | |
|---|---|---|---|
| 3,171,859 | 3/1965 | Sennewald et al. | 260—604 |
| 3,408,392 | 10/1968 | Yamagishi et al. | 260—530 |

LEON ZITVER, Primary Examiner

R. H. LILES, Assistant Examiner

U.S. Cl. X.R.

252—437, 470; 260—604